United States Patent [19]

Rutkowski et al.

[11] 4,025,261

[45] May 24, 1977

[54] UNDERBLOWN PARTS REMOVAL FROM CONTINUOUS BLOW MOLDING MACHINERY

[75] Inventors: Robert Rutkowski, Northampton, Mass.; Andrew M. Taylor, Bristol, Conn.

[73] Assignee: Monsanto Company, St. Louis, Mo.

[22] Filed: Apr. 2, 1975

[21] Appl. No.: 564,221

[52] U.S. Cl. .................. 425/139; 425/324 B; 425/326 B; 425/387 B; 425/392; 425/397; 425/DIG. 232; 425/DIG. 211

[51] Int. Cl.² ........................................ B29C 17/02

[58] Field of Search ... 425/139, DIG. 232, DIG. 206, 425/DIG. 211, 326 B, 324 B, 387 B, 392, 397

[56] References Cited

UNITED STATES PATENTS

| | | | |
|---|---|---|---|
| 3,149,373 | 9/1964 | Marzillier | 425/DIG. 211 |
| 3,225,382 | 12/1965 | Hagen | 425/326 B |
| 3,415,915 | 12/1968 | Lecluyse et al. | 425/DIG. 211 |
| 3,599,280 | 8/1971 | Rosenkranz et al. | 425/DIG. 211 |
| 3,611,484 | 10/1971 | Lecluyse et al. | 425/DIG. 211 |
| 3,778,213 | 12/1973 | Di Settembrini | 425/DIG. 211 |
| 3,918,866 | 11/1975 | Eichenberger et al. | 425/387 B |

Primary Examiner—Ronald J. Shore
Attorney, Agent, or Firm—Michael J. Murphy

[57] ABSTRACT

In continuous blow molding machinery employing a series of carriers successively traversing a closed path between preform loading, molding and molded article eject stations, an upwardly inclined removal ramp in the path of underblown parts but clear of the carriers is provided between the molding and loading stations for automatically removing such parts from the carriers. The method involves continuously stripping such parts before the loading station by elevating them relative to a rod portion of the carrier via interfering engagement with such ramp.

10 Claims, 8 Drawing Figures

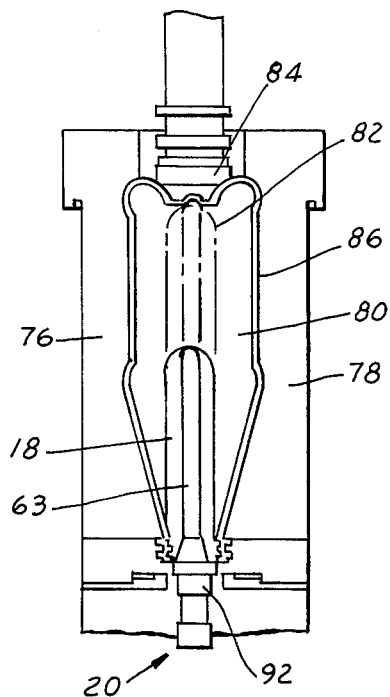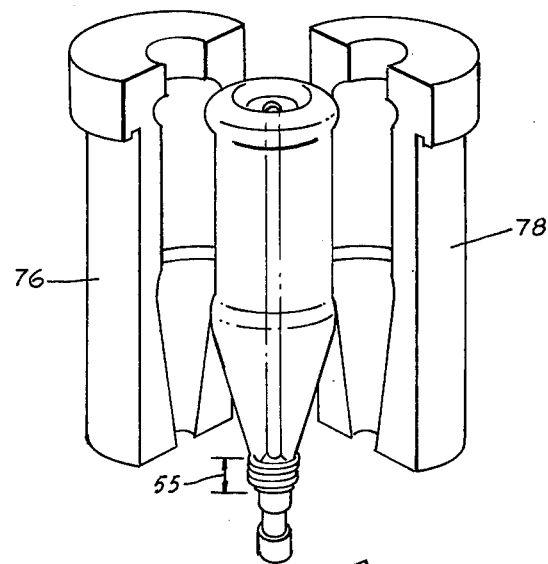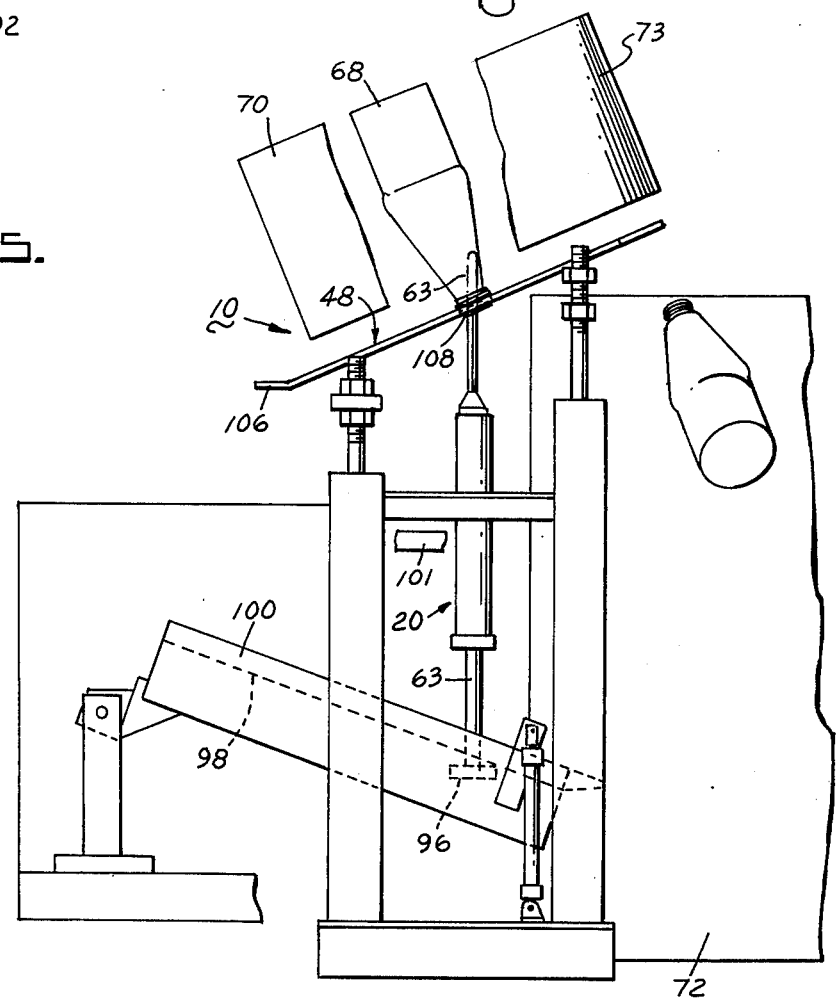

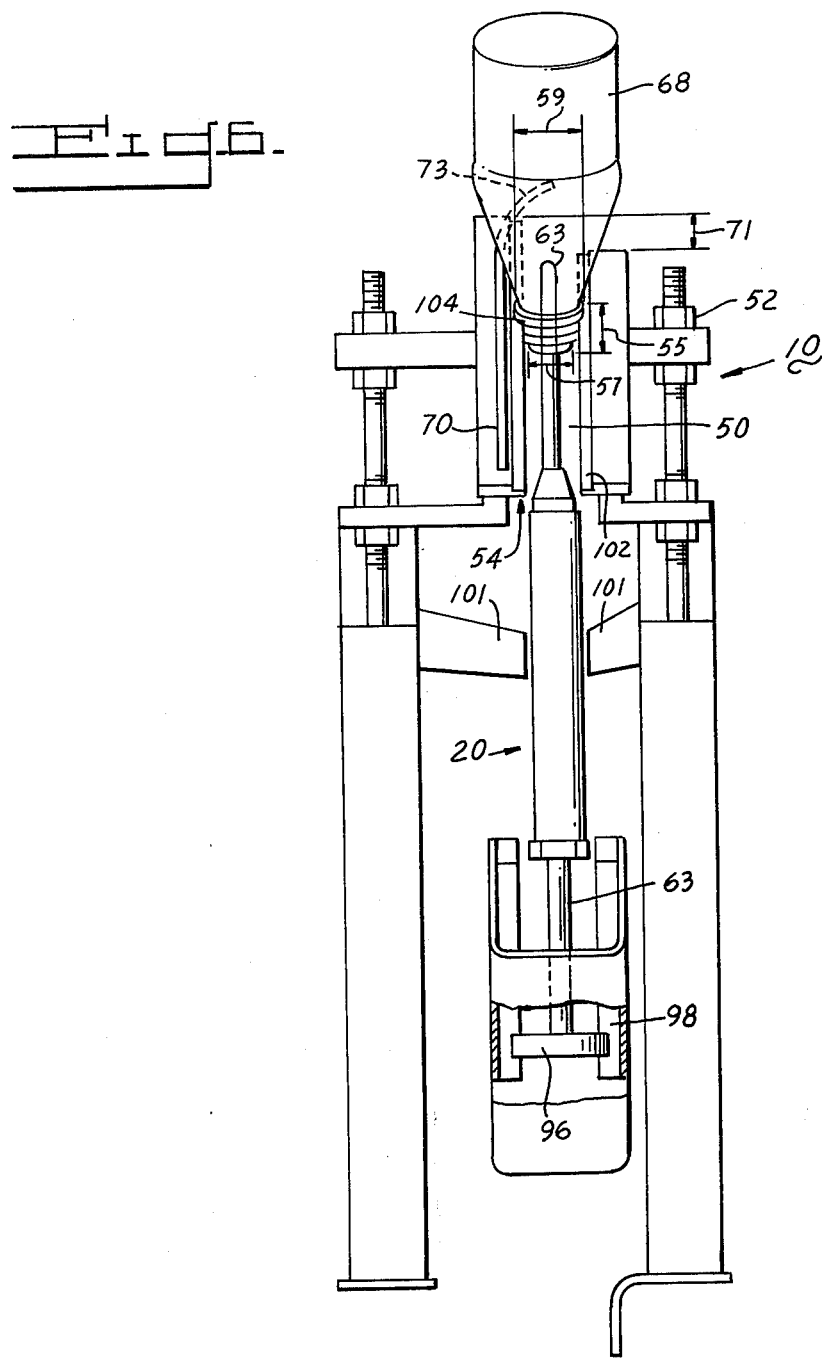

UNDERBLOWN PARTS REMOVAL FROM CONTINUOUS BLOW MOLDING MACHINERY

BACKGROUND OF THE INVENTION

This invention relates to blow molding and more particularly to removing parts from blow molding machinery.

Blow molding machines with continuously moving components facilitate high speed, high volume fabrication of hollow articles at low cost. A particular type of blow molding process which can be accommodated in such a system employs pre-molded blanks or preforms at elevated, molding temperature which are remolded to finished form in the high speed machine. In one existing form of continuous system such as described in commonly owned, copending applications Ser. No. 415,851, filed Nov. 14, 1973, a plurality of rod assemblies continuously traverse a closed path between successive stations where preforms are first loaded, then blown, then blown articles discharged and finally the assemblies are returned for further loading. Heretofore, whatever was on the rod assembly was ejected at the discharge station — be it a fully formed, in-specification article or a malformed article — in order that the continuously moving rod assemblies be available to accept more preforms at the loading station for the next cycle. However, it has been found that not every preform can be expected to be molded into a perfect article. For example, if the preform itself is malformed, or the seal between it and the blow mold for holding blow air is defective, blow pressure during forming cannot be held and the preform may either not blow at all or underblow in the sense of only partially forming the intended article. If the preform is too cold, similar problems occur whereas if it is too hot it may rupture before reaching the wall of the mold cavity during blowing, again presenting a malformed part.

As used herein "underblown part" means either a partially blown or completely unblown molded preform.

Ejecting all parts regardless of quality at the discharge station in the above environment intermingles underblown parts with accurately formed, in-specification articles, which dictates the need for downstream segregation. Deenergizing the continuous system on detection of an underblown part downstream of the blow molds is unattractive, especially if underblown parts frequency is rather high, since the equipment is usually quite substantial in size. Manual clearing of the system without shut down presents a serious safety hazard.

SUMMARY OF THE INVENTION

Now, however, method and apparatus improvements have been developed for use with a continuously operating blow molding system which overcome these prior art difficulties.

Accordingly it is a principal object of this invention to provide method and apparatus parts-removal improvements for use with a high speed, continuous blow molding machine.

An additional object is to provide a failure-proof, self-clearing positive method of removing underblown parts in such a system without requiring system shutdown.

Another object is to provide improvements for use with such a machine which discriminate between good and malformed parts and automatically remove the latter from the system.

A specific object is to provide such improvements which, from an apparatus standpoint, avoids the use of moving parts.

A further specific object is to provide parts-removal apparatus improvements which can be readily incorporated into existing continuous systems with a minimum of difficulty.

Other objects will in part be obvious and will in part appear hereinafter from the following description and claims.

These and other objects are accomplished in blow molding apparatus comprising a plurality of carriers, such as rod assemblies, continuously traversing a closed path between preform loading, preform molding and blown article discharge means, by providing the combination therewith of stripping means before the loading station for automatically removing underblown parts from the rod assemblies.

Also provided, in a blow molding process which includes the steps of loading preforms onto carriers at a loading station, distending them into articles in a series of continuously moving blow molds, removing the articles from the molds via the carriers and ejecting same from the carriers at a discharge station beyond said molds, such steps as just enumerated being carried out continuously and sequentially, is the combination therewith of the step of continuously stripping any underblown parts from the carriers upstream of the loading station.

BRIEF DESCRIPTION OF THE DRAWINGS

In describing the overall invention reference will be made to the accompanying drawings wherein:

FIGS. 3 and 4 are schematic elevational views illustrating the condition of the preform and finished article with respect to the forming mold in successive stations of the system of FIGS. 1 and 2;

FIGS. 5 and 7 are elevational and plan views respectively in enlarged form along 5—5 of FIG. 1 and 7—7 of FIG. 2;

FIG. 6 is an end view of the apparatus of FIG. 5; and

DETAILED DESCRIPTION OF ILLUSTRATED EMBODIMENT

Figure 1:
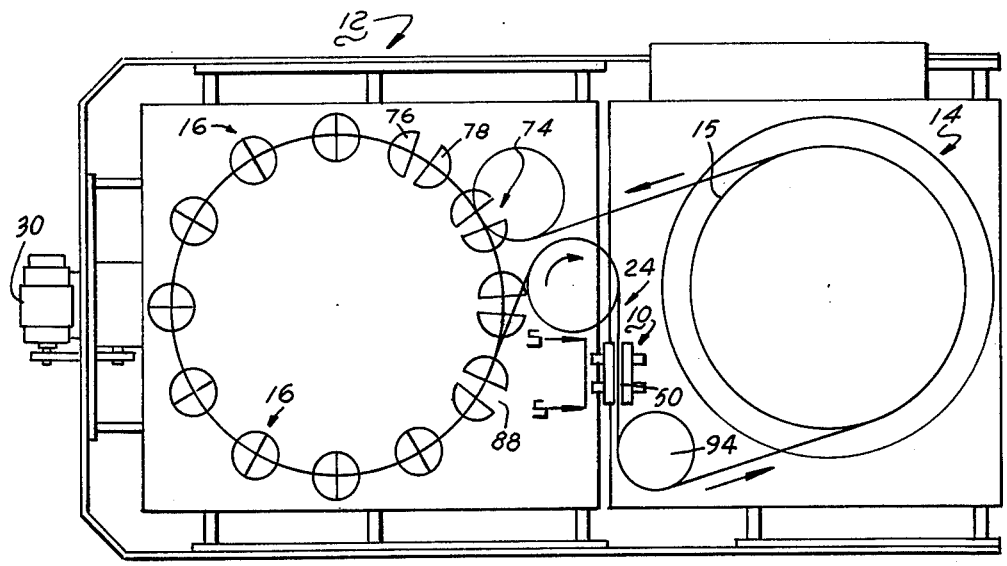
FIG. 1 is a schematic, plan view of the invention showing the same in operative relation to a continuous blow molding machine.
Figure 2:
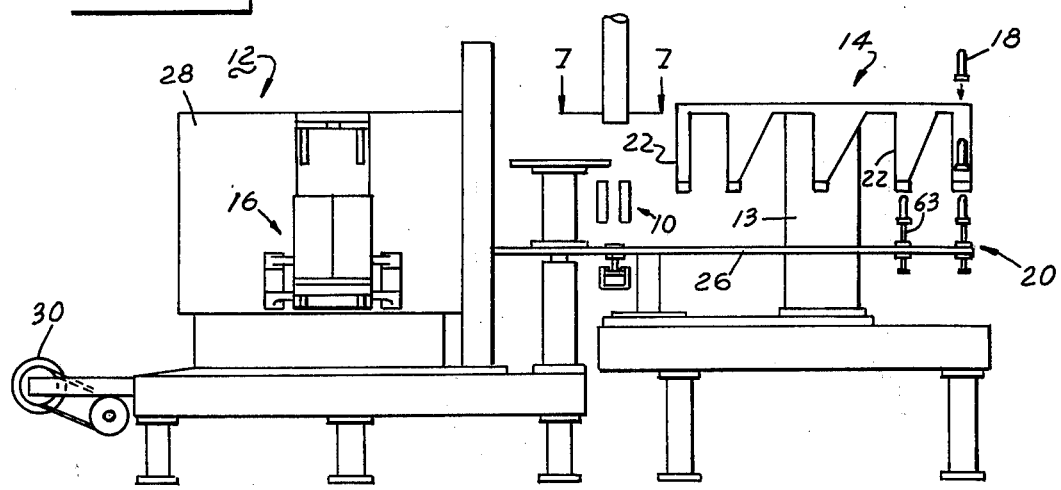
FIG. 2 is a partial front view of the apparatus of FIG. 1.

In describing the invention, reference will be made to the accompanying drawings wherein stripping means, generally indicated as 10, is shown in outline form in FIG. 1 and in detail in FIGS. 5, 6 for automatically removing underblown parts from rod assemblies between a molding station and a loading station, to be described.

Though operable with other forms of continuous blow molding machinery, FIGS. 1–4 depict a known, specific arrangement with which the invention is paricularly useful. Such system, schematically collectively identified as 12, includes loading means 14 for depositing preforms 18 onto carriers, which in the present embodiment are in the form of rod assemblies 20. Loading means 14 comprises a rotary loading turret 13 carrying a series of open-ended, tapered chutes 22, each of which comprises a loading station for sequentially receiving preforms 18, open-end down, from an upstream delivery source, not shown, and guiding them onto rod portion 63 of an assembly 20, one of which is in receiving position beneath a chute 22 at the time a preform is presented thereto. Rod assemblies 20 are operatively secured at spaced intervals on means comprising an endless chain 26, for continuously, sequentially positioning same within and removing them from downstream blow molds 16. Sprocket 15 rigid with rotary loading turret 13 meshes with chain 26 to impart the speed of the latter to the turret.

Preform molding means exist beyond loading means 14 comprising a plurality of molds 16, each including hinged sections 76, 78 operatively mounted around the periphery of rotatable molding station turret 28 which is continuously driven via power means such as motor 30 and conventional intermediate gearing, not shown, to repeatedly present molds 16 to the path of preforms 18 on carriers 20. A relatively large diameter turret sprocket wheel 29 (Fig. 7) carried with turret 28 intermeshes with chain 26 to impart movement to the latter from the input power train.

Blown article discharge means 24 (Figs. 1 and 8) beyond molds 16 along the endless path of rod assemblies 20 contains a discharge station for releasing a blow molded article, such as bottle 32, (FIG. 8) from each rod assembly 20 and comprises (FIGS. 7 and 8) rotatable discharge turret 34 carrying sprocket 36 also vertically positioned to intermesh with and thereby be rotated by chain 26. Tubular distribution branches 39 connect into a pressurized air supply header 38 and communicate via a rotary joint on header 38 on one end and a tap on the other end through sprocket 36 with the inlet of an on-off air valve 42 secured to the underside and equi-spaced from two or more others around sprocket 36. Each valve 42 has an outlet port in communication with a radial passage opening into an arcuate cutout in the periphery of sprocket 36, where rod assemblies 20 are temporarily successively seated during operation of the machine via conveying movement with chain 26. A rotary follower 41 on each valve 42 coacts with circularly arranged cam 43 rigidly mounted below via bracket 45 to the turret support. A raised, valve-actuating portion of cam 43 lies beneath single, fixed discharge chute 46, and after a rod assembly carrying a molded article such as bottle 32 is seated in the adjacent notch in sprocket 36, the follower-cam coaction during an orbital interval admits a blast of pressurized air through an inlet connection in housing 92 of assembly 20 to forcibly propel bottle 32 upwardly into chute 46.

Figure 7:
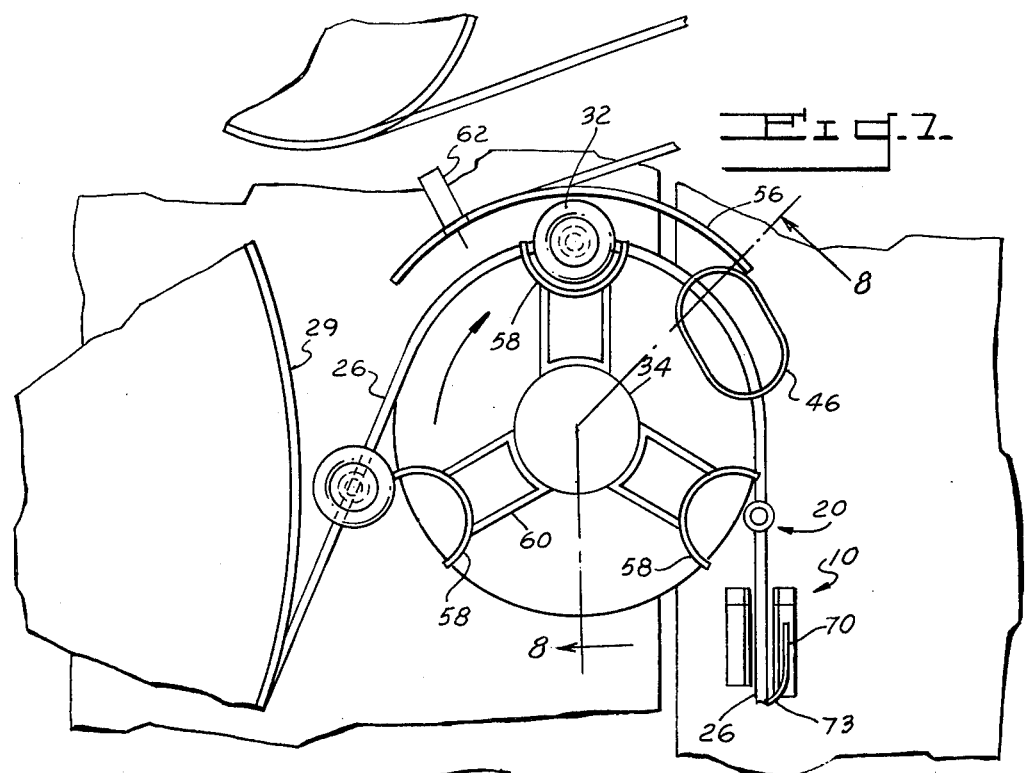
Figure 8:
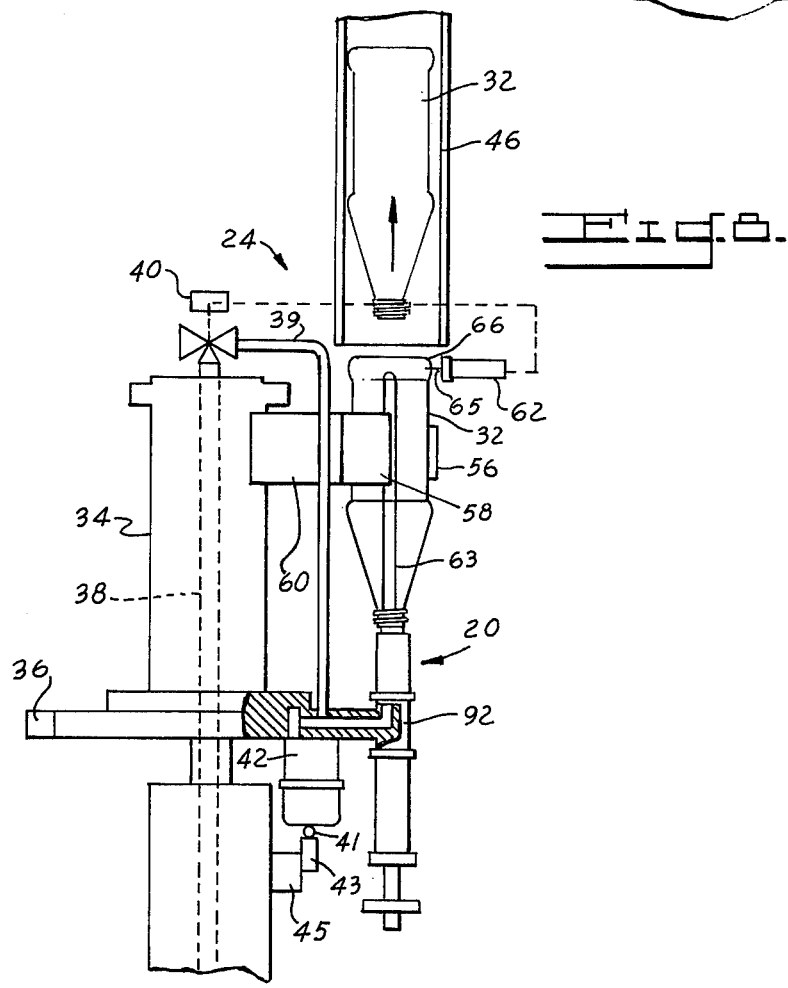
FIG. 8 is an elevational view taken substantially along 8—8 of FIG. 7.

Referring now to FIGS. 7 and 8, parts-centering means are provided with discharge turret 34 before stripping means 10 and comprise curved guide rail (FIG. 7) 56, preferably faced with a soft material, plus a series of equi-spaced semicircular open-fronted cups 58 secured via brackets 60 to rotary turret 34. Condition responsive discharge control means, or means operatively cooperating with discharge means 24 for selectively permitting removal of blown articles 32 and preventing removal of underblown parts 68 from a rod assembly 20 by discharge means 24 comprises detector 62, such as a commercially available photocell or whisker switch, mounted to guide rail 56 beyond molds 16 but before discharge chute 46, and electrically associated via conventional circuitry with three-way solenoid 40 (FIG. 8) on the air header 38 supplying eject air to the rod assemblies. As illustrated in FIG. 8, detector 62 is vertically positioned such that its probe 65 (or beam if such an optical device is used) will be intersected and activated by the uppermost portion of any blown bottle 32, such as heel 66, present on a rod 63 on passing by such probe. Cups 58 and guide rail 56 help to accurately position and prevent sidewise wobble of underblown parts 68 and fully blown articles 32 on rod assemblies 20 so that detection via detector 62 and ejection into chute 46 may be consistent when a fully blown article is present, and stripping via ramp 48 can occur reliably when an underblown part comes through.

Referring now to FIGS. 1, 5 and 6, according to the invention, stripping means 10 in a broad sense comprises means permitting relative axial movement between underblown parts 68 and rods 63 of rod assemblies 20, and, in the illustrated embodiment is mechanical in structure including an upwardly oriented removal ramp 48 inclined at an acute angle to the horizontal and situated between blow molds 16 and loading means 14 beyond discharge means 24 (FIG. 1). Stationary ramp 48 is slotted at 50 along its length and thus forms two rail pieces, one of which may be reduced somewhat in length at its upper end as at 71 to facilitate sidewise gravity drop-off of the underblown part at the upper discharge end of the ramp. Such pieces are vertically adjustable via threaded nuts 52 and studs in conventional manner, and supported from the overall machinery frame. The surface of the ramp along each side of slot 50 may be L-shaped (FIG. 6 at 54) in section to facilitate accommodating molded threaded finish 55 on the part being removed. With the embodiment shown, the horizontal width of slot 50 may vary with the geometry of the article being removed and ordinarily should be just slightly greater than the portion of the article passing therethrough. When such portion has molded spiral threads 104 thereon as shown, the width of slot 50 preferably lies between the diameter at the base of the threads (57 in FIG. 6) of the surface on which the threads are molded and the maximum ouside diameter 59 of the threads per se. The slot length and contour may also be varied from that shown, and in the illustrated embodiment is related to the contour of rod-retracting cam surface 98 and therefore must be at least as long as the linear distance required to retract such rod. Lengths on the order of 12 to 50 cms have been used successfully.

The location of stripping means 10 may vary somewhat from the preferred, shown location between the discharge and loading stations, but in any event must be before the latter in means 14 to insure that the rod assemblies are free of all parts when they arrive for loading. Deflector 70 beside slot 50, angularly directed at 73 toward space 71 and mounted to the framework supporting ramp 48 may be provided to urge underblown parts into a collection chute shown in outline form at 72 in FIG. 5.

In operation of the continuous blow molding system, rod assemblies 20 on chain 26 continuously successively traverse a fixed, closed path between preform loading stations beneath chutes 22 of loading means 14, then preform molding stations within molds 16, and finally a blown article discharge station along an arcuate portion of the circular path of discharge means 24. Closed end, deformable, previously molded, tubular thermoplastic preforms 18 are dropped, preferably uninterruptedly, through chutes 22 onto rods 63 of moving rod assemblies 20 sequentially presented at the loading stations. As presented, each preform 18 preferably has a molded end such as 55 in FIG. 6, already formed thereon which does not receive further remolding in the illustrated continuous system, and which is available for coaction with the stripping means in a manner to be described. Loaded assemblies 20 are continuously conveyed via chain 26 to positions within hinged sections of blow molds 16 which are synchronized via conventional cams, followers and timing mechanisms, not shown, so as to be open or separated at the time of presentation of a loaded rod assembly thereto, as indicated at the position numbered 74 in FIG. 1. After the sections close, the attitude of the preform with respect to surrounding, moving mold sections 76, 78 and 84 is illustrated at 18 in FIG. 3 — i.e. rod assembly 20 is concentric with cavity 80 formed by the closed side sections and mold base 84. As each closed mold continues around a circular path, preforms 18 are initially distended longitudinally to position 82 in FIG. 3 against the surface of mold base 84, and thereafter circumferentially outwardly to position 86 in FIG. 3 — i.e. into the contour of the surface of cavity 80 conforming to bottle 32. Such surface of cavity 80 is cooled in conventional manner to permit the plastic to set on contact therewith. In assuming position 82, rod 63 of each assembly is extended with respect to its housing 92 against the closed end of preform 18 via a suitable cam, not shown, which is circumferentially positioned beneath molding turret 28. Similarly, high pressure blow air is synchronously admitted thereafter to circumferentially expand the longitudinally stretched preform to position 86 by a suitable actuation mechanism, not shown.

When each mold 16 reaches 88 in FIG. 1, the hinged sections and base separate and the position of the parts is as shown in FIG. 4 — i.e. the forward end of rod 63 is seated in a dimple in the bottle base, and neck portion 55 snugly captively engages an abutment on housing 92. Thus, blown articles 32 via chain 26 and rod assemblies 20 are continuously removed from molds 16 after separation of the sections and thereafter transported toward the eject station within means 24 and vertically centered in an upright position via rail 56 and cups 58.

As the loaded assemblies pass in front of detector 62, the latter will either sense the presence of an adjacent molded surface or not. Solenoid valve 40 is normally closed thereby ordinarily preventing passage of high pressure discharge air forward to on-off valve 42 and into housing 92 as each valve 42 is operated by follower 41 and the abutting, coacting cam surface. Thus, if probe 65 of detector 62 senses the upper portion of a bottle, solenoid 40 opens to permit air to flow to valve 42 to propel the bottle off rod 63 via selective imposition of an air blast at the proper moment at the eject station into discharge chute 46. Thereafter, assemblies 20 via chain 26 training around idler sprocket 94 return to the loading stations to receive additional preforms for the next cycles. If detector 62 fails to sense an adjacent surface during movement of a rod assembly toward the eject station, which condition means the presence of an underblown part on a rod assembly, ejection of that particular part is avoided via transmission of an electrical signal to close valve 40 in the header feeding the individual air valves 42, so that such underblown part remains on its rod as it passes through the eject station. Variations of and additions to this electrical energization arrangement can be made in conventional manner by those skilled in the art. For example, holding circuits with timing devices may be used to open valve 40 for the proper time interval for ejection of good bottles at the high rates contemplated when bottles and underblown parts are randomly being presented. Thereafter, as rod 63 of that assembly passes linearly through slot 50 in stationary ramp 48, underblown part 68 is automatically stripped therefrom without stopping rod assembly movement. More specifically, as each rod assembly (Fig. 5) proceeds along through slot 50 guided, for example, by rails 101, disc 96 on the lower end of rod 63 engages profile surface 98 of downwardly directed rod-lowering cam 100 to linearly displace rod 63 downwardly out of underblown part 68 through its open end and into its lower preform-loading position. The width of slot 50 and the vertical position of lip 102 are such that the latter (Fig. 6) enter between adjacent threads 104 at the short, straight inlet end 106 of the stripping means where good engagement is achieved before commencing removal. Thereafter continued linear advancement of the rod assembly causes relative movement of the underblown part and carrier with respect to each other — i.e. part 68 being lifted via sliding interfering engagement of lip 102 with the lower surface of the uppermost of the two adjacent threads between which it is fitted and rod 63 being lowered through open end 108 of the underblown part 68. As part 68 proceeds upwardly along the ramp it strikes the inwardly canted end 73 of deflector 70 at which point rod 63 is completely out of the article thus allowing it to fall by gravity into chute 72.

With the stripping means embodiment just described the continuous motion of the carrier is used to advantage for underblown parts removal in that a fixed abutment is placed in the path of the part but clear of the carrier assembly, such abutment being configured to automatically elevate the part off the carrier assembly without requiring any moving components per se, and without interrupting the continued movement of the assemblies back toward the loading station. Integration of the compact assembly into existing continuous production lines is readily accomplished.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In blow molding apparatus comprising a plurality of rod assemblies continuously traversing a closed path between preform loading means, preform molding means and blown article discharge means;
  the combination therewith of:
  means operatively cooperating with said discharge means for selectively permitting removal of blown articles and preventing removal of underblown parts from said rod assemblies by said discharge means; and
  stripping means between the molding means and loading means downstream of said discharge means for automatically removing underblown parts from said rod assemblies which pass through said discharge means.

2. The apparatus of claim 1 wherein said stripping means comprises means permitting relative axial movement between the underblown parts and rod assemblies.

3. The apparatus of claim 2 wherein said stripping means permitting relative axial movement comprises:
   a stationary ramp between the blow molds and loading means.

4. The apparatus of claim 3 wherein said ramp is upwardly inclined and slotted along its length for passage of said underblown parts therethrough.

5. The apparatus of claim 4 wherein the surface of said ramp on either side of said slot is L-shaped in section.

6. The apparatus of claim 2 including:
   centering means before the stripping means for accurately positioning fully blown parts on the rod assemblies.

7. In blow molding apparatus comprising:
   a plurality of blow molds on a continuously driven support;
   means before said blow molds for loading preforms onto carrier assemblies;
   means for continuously sequentially positioning said carrier assemblies within and removing them from such molds; and
   means beyond said molds for discharging blow molded articles from said carrier assemblies;
   the combination therewith of:
   the mechanical stripping means downstream of said means for discharging and before said loading means for automatically removing underblown parts from said carrier assemblies; and
   means between the molding means and means for discharging for distinguishing blow molded articles from underblown parts.

8. The apparatus of claim 7 including:
   condition responsive discharge control means for said carrier assemblies between the molds and discharging means.

9. The apparatus of claim 7 including a deflector above said stripping means for directing underblown parts removed from the carrier assemblies toward recovery.

10. In blow molding apparatus comprising a plurality of moving rod assemblies downstream of a molding means, the improvement comprising, in combination:
    an upwardly inclined stationary ramp extending along and having a central slot coaxial with the direction of movement of the rod assemblies for raising underblown parts with respect to the rod assemblies during passage of such rod assemblies therethrough.

* * * * *